United States Patent [19]

England et al.

[11] 4,279,483

[45] Jul. 21, 1981

[54] ELECTRO-OPTICAL CHARACTER GENERATOR FOR PHOTOCOMPOSING APPARATUS

[75] Inventors: Charles J. England, Smallfield; Brian A. Bakewell, South Croydon, both of England

[73] Assignee: The Monotype Corporation Limited, Salfords Redhill, England

[21] Appl. No.: 131,377

[22] Filed: Mar. 18, 1980

[30] Foreign Application Priority Data

Mar. 21, 1979 [GB] United Kingdom ............... 09955/79

[51] Int. Cl.3 ...................... B41G 13/00; G03B 15/00; G03B 27/00

[52] U.S. Cl. .......................................... 354/5; 354/7; 354/4; 355/1

[58] Field of Search ............... 354/5, 7, 4; 346/107 R; 178/15, 30; 350/96.27; 355/1

[56] References Cited

U.S. PATENT DOCUMENTS

| | | | |
|---|---|---|---|
| 2,951,736 | 9/1960 | Black | 346/107 R |
| 3,299,434 | 1/1967 | McNaney | 350/96.27 |
| 3,832,488 | 8/1974 | Fahey et al. | 354/5 |
| 3,952,311 | 4/1976 | Lapeyre | 354/5 |
| 3,967,289 | 6/1976 | Yevick | 355/1 |
| 4,057,338 | 11/1977 | Yevick | 355/1 |

*Primary Examiner*—Russell E. Adams
*Attorney, Agent, or Firm*—Morgan, Finnegan, Pine, Foley & Lee

[57] ABSTRACT

A character generator for use in photocomposing comprises a fibre optic faceplate (23) of which the front face is polished and bevelled at its leading and trailing edges. On the rear surface of the faceplate is a mask which has an array of apertures each aperture encompassing a multiplicity of the fibres. Photoemissive diodes or other illuminators (25) are approximately aligned with the holes in the mask and are disposed for connection to terminals 22 on a printed circuit mounting. The generator is intended for use in the constitution of characters by selective illumination of elementary areas. The faceplate is intended to be in close proximity to a film or other radiation sensitive recording medium which is moved relative to the faceplate to build up lines of composition.

3 Claims, 6 Drawing Figures

ELECTRO-OPTICAL CHARACTER GENERATOR FOR PHOTOCOMPOSING APPARATUS

BACKGROUND TO THE INVENTION

This invention relates to electro-optical character generators for photocomposing apparatus.

It is known, in the art of photocomposing, to provide an array of light sources and to operate individual sources in that array to build up a character on a radiation-sensitive recording medium, such as a film, and to provide relative movements, usually termed set feed and line feed, between the array and the recording medium in order to build up lines of composition. Each character is a conglomeration of elementary areas illuminated by the various selectively operated sources of light.

In order to produce a composition of acceptable typographical quality on the recording medium the elementary areas, and accordingly the effective aperture of the individual sources of light must be very small, for example 0.001 inches or less. A visually clear but not typographically clear image may be obtained from an array of sources of larger effective aperture but the constraint of typographical quality makes the use of arrays which are satisfactory for more display devices unsatisfactory for typographical composition.

Moreover, typographical quality deteriorates unless the light from any particular source or effective source is confined to the area or areas which ought to be illuminated by that source. Various arrangements have been devised to overcome or minimise "cross-talk" between the sources.

SUMMARY OF THE INVENTION

The present invention particularly concerns an improved scanning head by means of which acceptable typographical quality may be obtained even though the illuminator, such as a cathode ray spot or illuminators, such as light emitting diodes, may have effective aperture or size which hitherto would render them unsuitable for use in photocomposition by the selective illumination of elementary areas on a recording medium.

The present invention is, therefore, intended for use in photocomposing apparatus in which a recording medium which is sensitive to radiation is movable relative to a head including, in effect, an array of light sources which are selectively operable to provide illumination of elementary areas of the medium and thereby to build up images of characters by a conglomeration of such illuminated areas. In general, the light sources may be constituted, as is known, either by a corresponding plurality of illuminators or by, for example, a single illuminator such as a cathode ray spot which is movable to illuminate a mask of which the various apertures constitute secondary light sources. According to the invention the said head comprises a faceplate which has two opposed broad faces and which is disposed such that one broad face as aforesaid is in close proximity to the said medium. The faceplate is constituted by a multiplicity of parallel optical fibres disposed substantially normal to the said broad faces. Disposed closely adjacent one or other of said broad faces, but preferably the face other than that which is in close proximity to the medium, is a mask having an ordered array of apertures which define the light sources and each encompasses the adjacent ends of a multiplicity of the said fibres. Such an arrangement may be used in conjunction with suitable means for selectively illuminating the apertures even though those means are of size or effective size substantially greater than the apertures in the mask. If, for example, light emitting diodes are used, they need not be of the same order of size as the apertures in the mask but may in general be substantially larger, up to the spacing of the apertures in the mask and need not be accurately aligned with the apertures in the mask provided that each illuminates the respective aperture of the mask.

Thus light emitting diodes of sufficient output power may be used to provide illumination of selective regions of smaller area than would otherwise be conveniently possible. If the head is used with cathode ray illumination of the apertures, the focusing of the scanning spot may be much less accurate without loss of typographical quality.

Although it might be desirable, in general, to use an array of apertures which is constituted by a single line, the requirements of typographical quality prescribe a spacing between apertures which would normally be too small for the convenient accommodation of, for example, light emitting diodes. It is normally desirable therefore that the array of apertures comprises a two dimensional array of which the apertures in each column are staggered relative to the apertures in adjacent columns.

BRIEF DESCRIPTION OF THE ACCOMPANYING DRAWINGS

Figure 1:
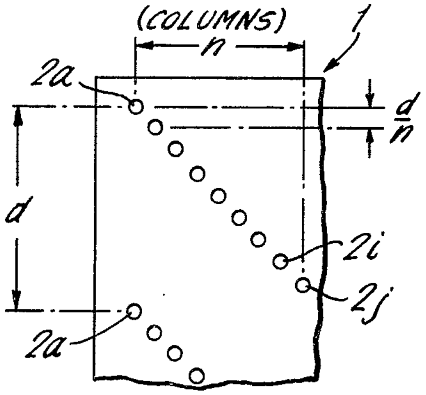
FIG. 1 illustrates a mask pattern which may be used in photocomposing apparatus according to the invention.
Figure 2:
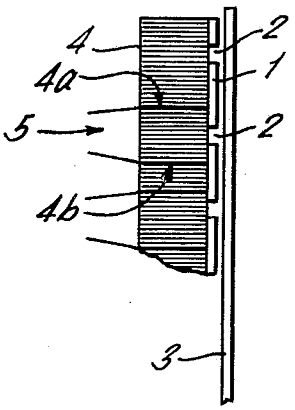
FIG. 2 illustrates a cross section through part of one embodiment of a head arranged according to the invention.

In FIG. 1 is shown a mask 1 provided with arrays of apertures **2*a*–2*j*, each array being disposed along the diagonal of a two-dimensional position matrix. Each aperture is preferably 0.001 inches in diameter and in order to provide a continuous longitudinal image by relative transverse movement of the matrix and sequential illumination of the sources the nearest adjacent aperture is displaced longitudinally. In effect the arrays comprise a single array of rows and columns, each row being askew so that the apertures in each column are offset from the apertures in adjacent columns. The use of light sources, such as light emitting diodes, in such an array and the manner in which such an array of light sources may be selectively operated to provide illumination of respective elementary areas of a medium which moves relative to an array are known and will not be described in detail. Two known systems are described in the specifications of U.S. Pat. No. 3,952,311 and British Patent No. 1,328,247. FIG. 2 illustrates schematically one possible arrangement of the "head" that is to say that part of the illuminating arrangement which is disposed closely adjacent a recording medium 3. In FIG. 2 the head and the medium are shown separated but in practice it is desirable that the separation be, at the most, very slight, in order to avoid undesirable dispersion of the light which illuminates the selected elementary areas. In FIG. 2, there is shown a mask 1 having apertures 2 disposed in close proximity to the recording medium 3. The mask is provided on the front, broad, face of a fibre optic plate 4** which is composed of a multiplicity of parallel optical fibres extending from the rear, broad, face of the plate to the front face. The diameters of the fibres are intended to be very much smaller than the apertures in the mask; this is quite feasible even though the apertures in the mask may be only 0.001 inches in diameter.

In FIG. 2 the ray of light coming from a light emitting diode or other illuminator approximately aligned with one of the apertures is denoted by the reference 5. This light is conveyed across the plate by a bundle of fibres of which, in one dimension, the extreme fibres are denoted 4*a* and 4*b*. It will be observed that provided that the effective size of the illuminator for the respective aperture is less than the spacing between adjacent apertures, accurate alignment of the illuminator and the aperture is not required and that the fibres prevent the illumination of those mask apertures which are not to be illuminated by that illuminator.

The mask 1 may comprise a metallised layer deposited, for example by vacuum evaporation and photolithographic techniques, directly on the fibre optic plate.

Although the arrangement shown in FIG. 2 is possible, it may not be desirable if the film 3 abrades the mask and for this, and other reasons, it is more preferable to provide the mask on the rear face of the fibre optic plate, as will be described later with reference to FIGS. 5 and 6.

It will be appreciated that the light emitting diodes or other illuminators may be switched on and off as desired, or they may be left continuously on but provided with shutters, constituted by a liquid crystal arrangement deposited on the rear broad face of the fibre optic plate. It is, moreover, feasible to scan the rear of the fibre optic plate with a flying spot or cathode ray beam of which the diameter may be substantially larger than the apertures in the mask.

Figure 3:
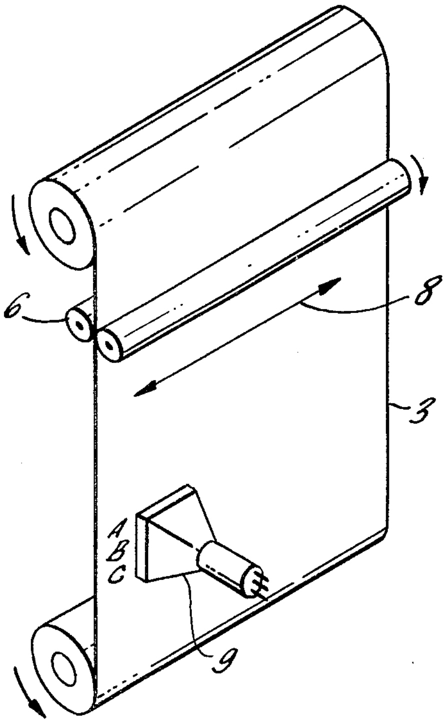
FIG. 3 illustrates schematically part of a photocomposing apparatus in which the invention may be used.
Figure 4:
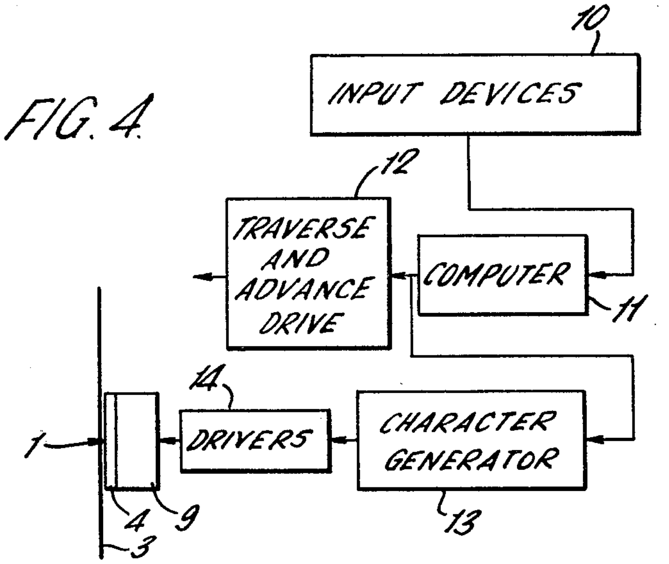
FIG. 4 illustrates schematically a control system for a photocomposing apparatus.

FIGS. 3 and 4 illustrate, for the sake of completeness only, photocomposing apparatus which has a scanning head 9 including a cathode ray tube which illuminates the rear of a fibre optic plate which carries a mask as already described. Apart from the scanning head, the arrangement is of generally known form. The scanning head 9 traverses across the elongate film 3, that is to say in the direction of an arrow 8, and the film itself is progressed lengthwise by means of a drive system illustrated schematically by feed rollers 6. FIG. 4 illustrates, a typical control system for a photocomposer. Various input devices 10 provide signals defining the composition to be made to a computer 11 which derives suitably coded character selection signals which control a character generator 13 which determines the selection of particular illuminators or the control of the cathode ray scanning of the mask. If individual illuminators are used for the apparatus in the mask, the character generator 13 normally controls drivers for the respective illuminators. The computer 11 controls also a traverse and advance drive system for controlling the movements of the scanning head 9 and the film 3.

Figure 5:
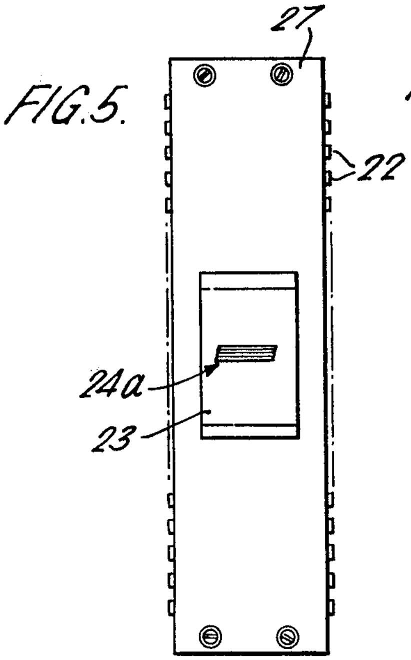
FIG. 5 illustrates a preferred form of head according to the invention.
Figure 6:
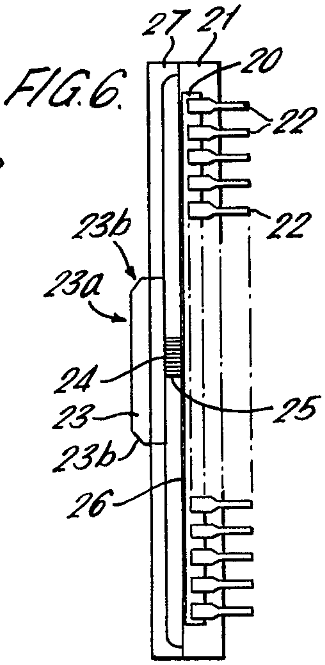
FIG. 6 is another, partly sectional, view of the head shown in FIG. 5.

FIGS. 5 and 6 illustrate a preferred embodiment of the head previously mentioned. The head comprises a standard printed circuit board mount 20 which is provided at its rear with a metal stiffener 21 and which has along each side, a row of terminal pins 22 which can fit into a standard connector. The front surface of a mounting board 27 extending over the printed circuit is recessed to accommodate a fibre optic plate 23 of which the front face 23*a* is polished. The leading and trailing edges of the plate are bevelled and the corners of it are radiused. On the rear face of the fibre optic plate is a mask 24 which covers the entire area of the rear of the plate except for a region 24*a* near the centre of the plate; this region has a pattern of apertures like that described with reference to FIG. 1. The region 24*a* of the apertures is illustrated as if it were on the front face of the plate in FIG. 5. The array may be an $8\times32$ array in staggered form as illustrated in FIG. 1. Behind the mask is provided an array of light emitting diodes, of which there is one for each aperture in the mask. Each diode is approximately aligned with its respective aperture. The diodes 25 are connected by any convenient arrangement of a planar circuit 26 to the terminals 22.

The head shown in FIGS. 5 and 6 has the advantage that, provided that the front face of the plate 23 is in close proximity of the film, cross-talk is substantially eliminated.

We claim:

1. In photocomposing apparatus in which a recording medium which is sensitive to radiation is movable relative to a head including means defining an array of light sources which are selectably operable to provide illumination of elementary areas of the medium and thereby to build up images of characters by a conglomeration of such areas, the improvement wherein said head comprises:

(a) a faceplate having opposite broad faces and disposed for traversal relative to said medium and in close proximity thereto, said faceplate being constituted by a multiplicity of parallel optical fibres disposed substantially normal to said broad faces;

(b) a mask having an ordered array of apertures, of which each aperture encompasses the adjacent ends of a multiplicity of the said fibres, said mask being disposed closely adjacent one of said broad faces of said faceplate; and (c) means for selectively illuminating regions of the rear of said faceplate, said regions corresponding to said apertures.

2. The improvement defined in claim 1 in which the said surfaces of the faceplate comprise a front surface adapted for movement over the surface of the said medium and a rear surface which is partially covered by said mask.

3. The improvement defined in claim 1 in which the mask is disposed on the front surface of the face plate.

* * * * *